April 30, 1963

W. M. HARKS 3,087,562

SELF-PROPELLED ATTACHMENT FOR GOLF-BAG CARTS

Filed March 15, 1961

INVENTOR
WALTER M. HARKS
BY Joseph F. Cole
ATTORNEY

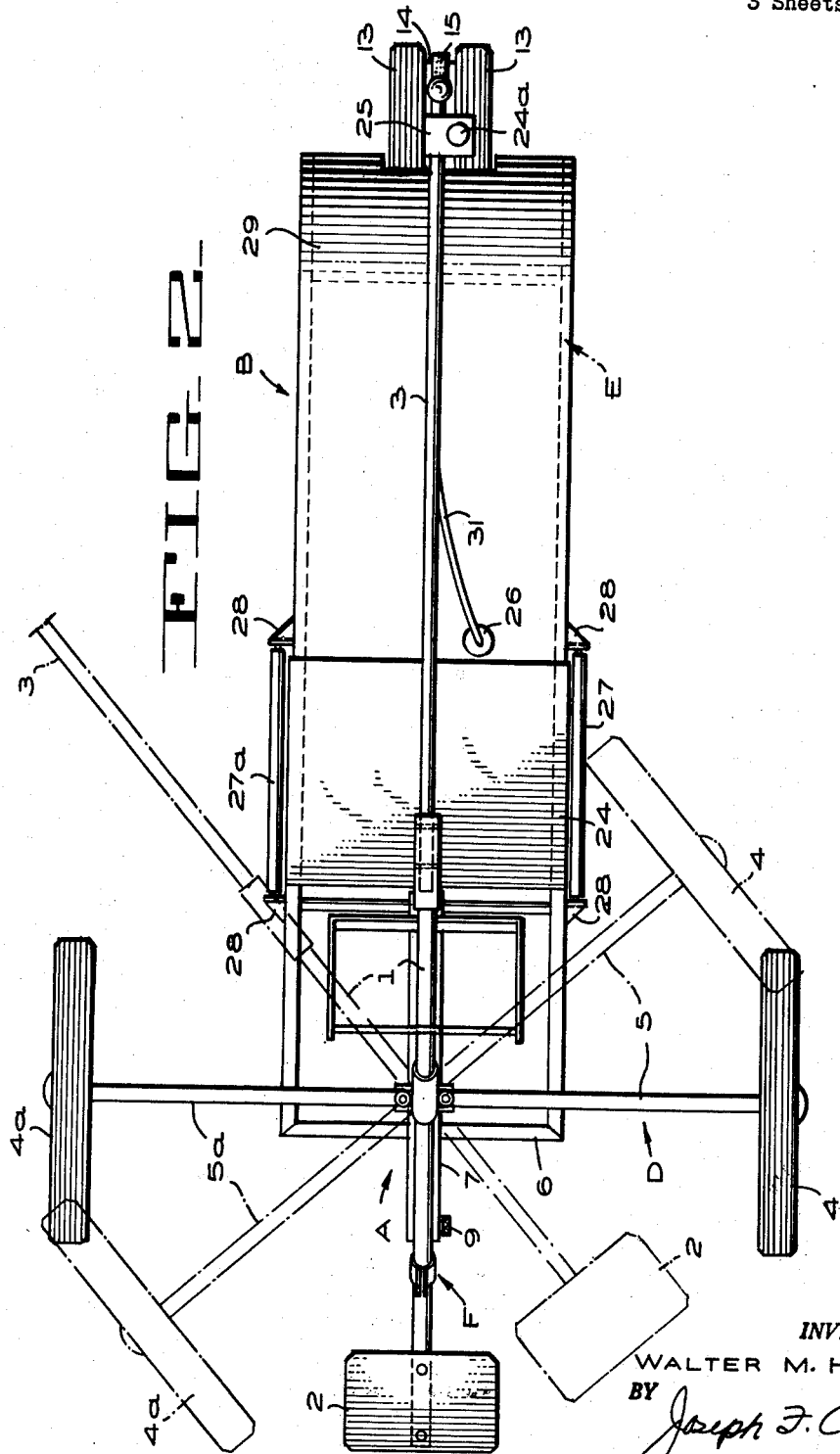

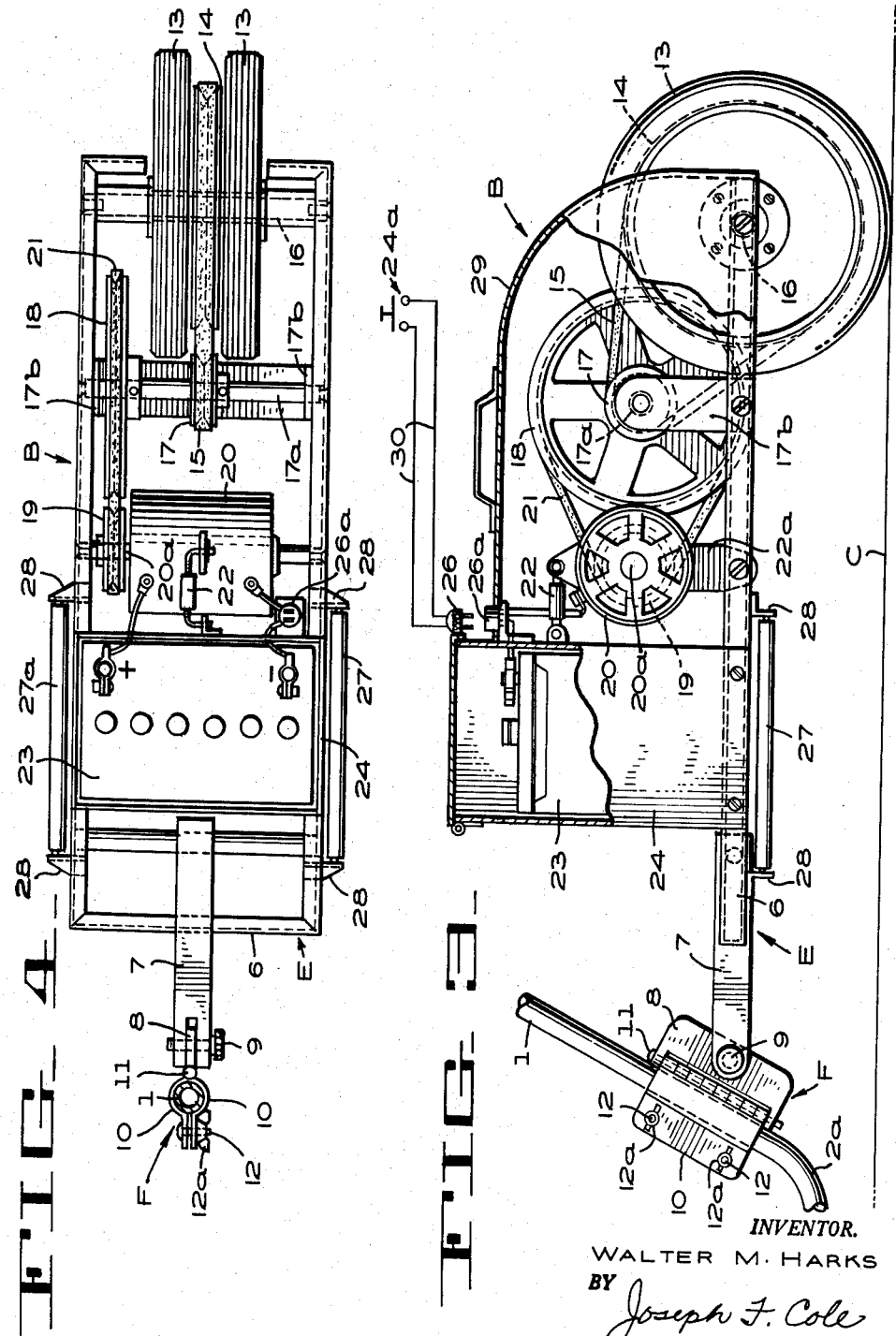

United States Patent Office 3,087,562
Patented Apr. 30, 1963

3,087,562
SELF-PROPELLED ATTACHMENT FOR
GOLF-BAG CARTS
Walter M. Harks, 210 Eucalyptus Ave.,
South San Francisco, Calif.
Filed Mar. 15, 1961, Ser. No. 95,841
2 Claims. (Cl. 180—11)

This invention relates generally to a motor vehicle steered by a walking attendant. More specifically, it relates to a power operated device adapted to be detachably connected to a two wheeled cart which is normally intended for manual operation, such as is used to transport a bag of clubs on a golf course.

It is an object of the invention to provide a power operated device which may be quickly and conveniently attached to a manually propelled cart in such a manner that the combination of the power device and the cart produces an articulated three wheeled vehicle which may be readily steered and controlled by a walking attendant.

Another object of the invention is to provide a propulsion device or self-propelled attachment, which is easily transportable and which may be attached indiscriminately to any golf cart available for hire at the point of use.

A still further object of the invention is to provide a motor vehicle under the control of a walking attendant, which is composed of relatively light weight members that may be readily assembled into a composite motor vehicle which would otherwise be cumbersome and unwieldy to transport as an integrated unit.

An additional object of the invention is to provide a motor vehicle controlled by a walking attendant which comes to rest in an automatically braked position when the attendant releases control thereon.

It is a further object of the invention to provide quickly attachable propelling means for a manually operated cart, without mutilating the cart or otherwise impairing its usefulness as a conventional vehicle when the device has been detached.

Other objects and advantages will appear as the specification continues. The novel features will be set forth in the appended claims.

Drawings

For a better understanding of the invention, reference should be had to the accompanying drawings, forming part of this application, in which:

FIGURE 2 is a plan view of the propulsion device attached to a typical golf bag cart showing by dot-dash lines the steering arc permitted by the combination.

FIGURE 3 is a side elevational view of the propulsion device, showing its attachment to a fragmentary segment of a substantially upright post or standard of a typical golf bag cart, and diagrammatically illustrating the control switch that is located on the steering handle of the cart.

FIGURE 4 is a plan view of the propulsion device, parts being omitted so as to disclose the interior construction.

Detailed Description

Figure 1:
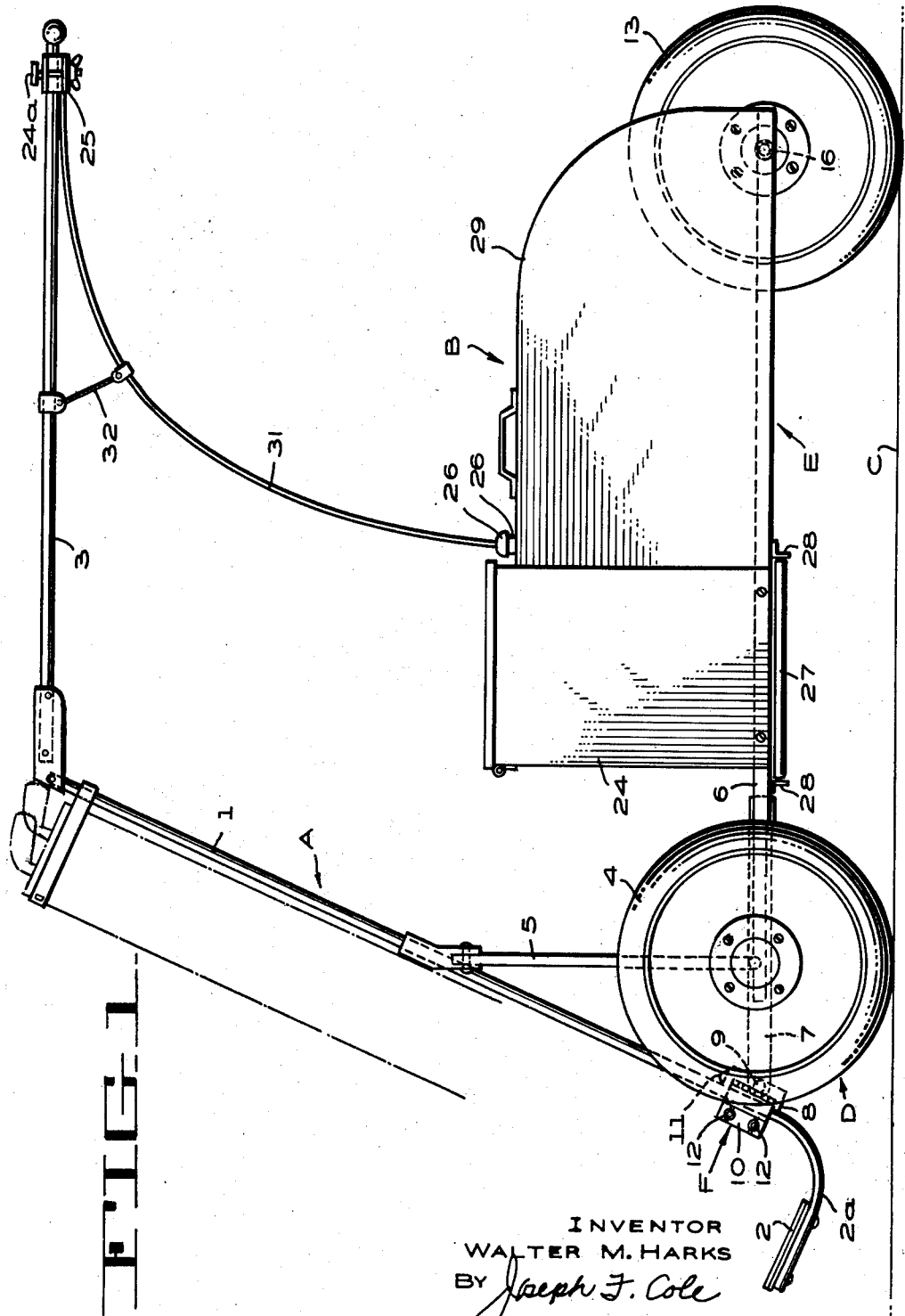
FIGURE 1 is a side elevation view of the propulsion device attached to a typical golf bag cart.

Referring now to the drawings in detail, I have shown a conventional golf-bag cart which is designated generally at A in FIGURES 1 and 2. It will be noted that a self-propelled attachment B, or propulsion device, is removably connected to the cart A so as to propel the latter over the ground C.

It will be understood that no claim is made to the cart itself, except in combination with my attachment for effecting an integrated motor vehicle when the cart A and the self-propelled attachment B, or propulsion device, are connected.

The typical cart A shown in FIGURES 1 and 2 which the self-propelled or propulsion device B is adapted to be attached defines of a rigid upstanding post 1 having a bag-supporting bracket 2 at its curved lower end 2a, and a foldable steering handle 3 lockably hinged at its upper end. The post 1 is supported by a pair of transversely spaced wheels 4, 4a, mounted on hinged spindles 5, and 5a, the angular ends of which form axles for the wheels 4, 4a. The hinged spindles 5, 5a, when extended for use have lockable means (not shown) for maintaining the wheels 4, 4a, in fixed operable relationship to post 1. The wheels 4, 4a and the hinged spindles 5, 5a constitute a roll-about carriage D which is movable over the ground C, under direct control of a walking attendant operating the steering handle 3 in the desired direction.

It will be observed that in a cart of this typical construction the curved lower part 2a of post 1 and the bag-supporting bracket 2, because of a pivotal position with respect to the axles of spindles 5, 5a, would normally tend to rest the bracket 2 on the ground C. The post must be moved to a tilted position by downward pressure on steering handle 3 so as to clear the bracket 2 from the ground, when it is desired to propel the cart.

The self-propelled attachment, or propulsion device, which is the subject of this invention comprises a chassis E arranged in back of the roll-about carriage D. This chassis has a frame 6 which is substantially narrower than the width of the space between wheels 4, 4a, terminating in a slotted tongue 7 at its forward end which pivotally engages a vertical member 8 of a clamping device F when a threaded pin 9 is inserted through the bifurcated end of the tongue.

The clamping device F comprises a pair of laterally separate jaws 10 hinged at their rearward ends on a journal pin 11 which extends in an upward direction through the vertical member 8 in such a manner that the carriage D maybe swung about this pin by the post 1, when the clamping jaws are rigidly, though detachably, engaged with post 1 by means of a pair of fastening screws and wing nuts, 12, 12a, respectively. As clearly shown in FIGURE 3 of the drawings, the clamping device F defines a hinge; its upwardly-extending journal pin 11 permits the post 1 to be rotated in either direction about its axis, when the cart is being steered.

It will now be seen that the frame 6 is pivotally engaged with post 1 both horizontally at pin 11, and vertically at pin 9, thus permitting the cart to be steered independently of any restriction from the self-propelled attachment, or propulsion device, and to be tilted backwardly to free lower end of the post 1 from its normal frictional engagement with the ground C when it is desired to propel the cart.

At the rear of the frame a dual drive or traction wheel 13, having a sheaved member 14 between its treads for engaging a V-belt 15, is rotatably mounted on an axle 16 which is rigidly attached to frame 6 (see FIGURE 4). A conventional speed reducing arrangement of sheaved pulleys, 17, 18, and 19, transmits the energy of an electric motor 20 through V-belts 21 and 15 to the dual drive wheel 13.

As clearly shown in FIGURE 4, the pulleys 17 and 18 are secured to a countershaft 17a, which is rotatably supported in bearing plates 17b fixed to and rising from the frame 6. The belt 15 is trained around the sheaved member 14 and the pulley 17. The pulley 19 is fixed to the driven shaft 20a of the electric motor 20.

A conventional belt-tightening toggle 22 holds the electric motor 20 in driving relationship to the driven components of the V-belt transmission system. The motor 20 is supported at its bottom by a swingable arm 22a (see FIGURE 3). A storage battery 23, nested in a compartment of a casing 24 rigidly affixed to frame 6, is detachably connected by conducting wires to the electric motor 20 through a normally open actuating switch 24a which is detachably affixed adjacent to the end of steering handle 3 by means of a clamping bracket 25 and a conventional plug and socket connection 26, 26a, respectively, in the switch circuit.

The electric motor 20 constitutes a power unit which is mounted on the chassis E, this power unit being operatively connected to the dual traction wheel 13 through the belts and pulleys previously described to thus propel the attachment B and the golf-bag cart A over the ground C.

It will be observed that the chassis E of the self-propelled attachment B has substantially horizontally disposed rollers 27, 27a mounted at the opposite lateral sides thereof by brackets 28 that are fixed to the frame 6 to project therefrom. These rollers are positioned to have the wheels 4, 4a of the cart A abut thereagainst, when the cart is swung through a predetermined angular movement relative to the attachment (see FIGURE 2). These rollers prevent the cart wheels from engaging with the chassis and damaging the tread on the wheels 4, 4a. The pair of rollers 27, 27a, rotatably attached to either side of frame 6, act as antifriction devices when the cart handle 3 is turned for steering in an arc wide enough to cause wheels 4, 4a, to come into contact with frame 6.

It should be noted that the steering handle 3 of the golf-bag cart A is disposed above the self-propelled attachment B, and extends rearwardly from the post 1 to at least the trailing end of the chassis E, whereby a walking attendant may grasp the steering handle 3 and steer the galf-bag cart A without stepping on the self-propelled attachment B.

Moreover, the switch 24a for controlling the operation of the electric motor 20 is mounted adjacent to the trailing end of the steering handle 3 within reach of the walking attendant, while grasping the steering handle.

The electric motor 20 and the power unit may be enclosed and protected by a removable cover 29, as illustrated in FIGURES 1 to 3, inclusive, of the drawings. Moreover, the electrical wires 30 leading from the plug 26 to the switch 24a (see FIGURE 3) may be enclosed in an insulated sheath 31 having sufficient slack to permit the steering handle 3 to be swung through the desired arc, when steering the cart A. A tension spring 32 may have its ends connected to the steering handle 3 and the sheath 31 so as to take up the slack in this sheath.

*Summary of Operation*

The operation of the device is as follows: The walking attendant first depresses the steering handle 3 to free the lower end 2a of the post 1 from its normal position on the ground C, thus effecting a three point supported wheeled vehicle free to be propelled by energizing electric motor 20. Thumb pressure on switch 24a establishes the electrical circuit between storage battery 23 and electric motor 20, and the cart A is thus propelled forward. Steering is accomplished by rotating handle 3 in a horizontal arc. When the attendant's hand is released from the handle 3 and the switch 24a, the cart comes to rest in a braked position due to engagement of the lower end of the post 1 with the ground C.

I claim:

1. The combination with a golf-bag cart having a roll-about carriage movable over the ground; a post secured to the carriage to extend upwardly therefrom; and a steering handle attached to the post and being swingable by a walking attendant to thus steer the carriage over the ground; the post having a bag-supporting bracket at its lower end which normally rests on the ground to provide a braking action for the carriage; the bag-supporting bracket being movable into an elevated position to clear the ground, when the post is tilted by downward pressure on the steering handle; of a self-propelled attachment for the golf-bag cart comprising: a chassis arranged in back of the roll-about carriage; means removably clamping a leading end of the chassis to the post of the roll-about carriage, and including an upwardly-extending journal pin about which the carriage is swingable by the post to steer the carriage as the chassis trails therebehind; the means removably clamping the chassis to the post including a horizontal pin about which the post may be tilted to clear the bag-supporting bracket from the ground; at least one ground-engaging traction wheel supporting the chassis of the attachment; and a power unit mounted on the chassis, and being operatively connected to the traction wheel to thus propel the attachmen and the golf-bag car over the ground.

2. The combination as set forth in claim 1; and in which the steering handle of the golf-bag cart is disposed above the self-propelled attachment, and extends rearwardly from the post to at least a trailing end of the chassis of the attachment, whereby the walking attendant may grasp the steering handle from a position rearwardly of the attachment and steer the golf-bag cart and may tilt the post to elevate and depress the bracket relative to the ground without stepping on the self-propelled attachment.

References Cited in the file of this patent

UNITED STATES PATENTS

| Re. 11,046 | Gedney | Dec. 17, 1889 |
| 2,812,824 | Adams | Nov. 12, 1957 |
| 2,919,758 | Newton et al. | Jan. 5, 1960 |